United States Patent
Hsiang et al.

(10) Patent No.: US 9,900,625 B2
(45) Date of Patent: Feb. 20, 2018

(54) METHOD AND APPARATUS FOR EFFICIENT INFORMATION CODING

(71) Applicant: MediaTek Inc., Hsinchu (TW)

(72) Inventors: Shih-Ta Hsiang, New Taipei (TW); Tzu-Der Chuang, Zhubei (TW)

(73) Assignee: MediaTek Inc., Hsinchu (TW)

( * ) Notice: Subject to any disclaimer, the term of this patent is extended or adjusted under 35 U.S.C. 154(b) by 241 days.

(21) Appl. No.: 14/660,454

(22) Filed: Mar. 17, 2015

(65) Prior Publication Data

US 2015/0264355 A1   Sep. 17, 2015

Related U.S. Application Data

(60) Provisional application No. 61/954,151, filed on Mar. 17, 2014, provisional application No. 61/970,384, filed on Mar. 26, 2014, provisional application No. 62/000,185, filed on May 19, 2014.

(51) Int. Cl.
*H04N 19/91* (2014.01)
*H04N 19/517* (2014.01)

(52) U.S. Cl.
CPC .......... *H04N 19/91* (2014.11); *H04N 19/517* (2014.11)

(58) Field of Classification Search
None
See application file for complete search history.

(56) References Cited

U.S. PATENT DOCUMENTS

| | | | | |
|---|---|---|---|---|
| 2013/0272377 A1* | 10/2013 | Karczewicz | ............ | H03M 7/30 375/240.02 |
| 2013/0336386 A1* | 12/2013 | Chong | ............ | H04N 19/00066 375/240.02 |
| 2015/0098504 A1* | 4/2015 | Pang | .................... | H04N 19/176 375/240.12 |

OTHER PUBLICATIONS

Sasai, Hisao et al., Modified MVD coding for CABAC, Joint Collaborative Team on Video Coding (JCT-VC) of ITU-T SG-16 WP3 and ISO/IEC JTC1/SC29/WG11, 6th Meeting: Torino, IT, Doc. No. JCTVC-F423 (Jul. 12, 2011).*
Sasai, Hisao, et al., Modified MVD coding for CABAC, Joint Collaborative Team on Video Coding (JCT-VC) of ITU-T SG-16 WP3 and ISO/IEC JTC1/SC29/WG11, 6th Meeting: Torino, IT, Doc. No. JCTVC-F423 (Jul. 12, 2011).*

* cited by examiner

*Primary Examiner* — William C Vaughn, Jr.
*Assistant Examiner* — Lindsay Uhl
(74) *Attorney, Agent, or Firm* — Oblon, McClelland, Maier & Neustadt, L.L.P.

(57) ABSTRACT

A method of efficient information coding is provided. The method may code a bin string for signaling prefix part of a binarized absolute value of a first vector component of a block vector difference (BVD) or a motion vector difference (MVD). The method may code a bin string for signaling a prefix part of a binarized absolute value of a second vector component of the BVD or the MVD. The method may also code a bin string for signaling a suffix part of a binarized absolute value and a sign of the first vector component. The method may further code a bin string for signaling a suffix part of a binarized absolute value and a sign of the second vector component.

24 Claims, 9 Drawing Sheets

400

| \|x\| | \|x\| in binary | msb_plus_one | Refinement bins |
|---|---|---|---|
| 0 | 0 | 0 | - |
| 1 | 1 | 10 | - |
| 2 | 10 | 110 | 0 |
| 3 | 11 | 110 | 1 |
| 4 | 100 | 1110 | 00 |
| 5 | 101 | 1110 | 01 |
| 6 | 110 | 1110 | 10 |
| 7 | 111 | 1110 | 11 |
| 8 – 15 | 1000 – 1111 | 11110 | 000 – 111 |
| 16 – 31 | 10000 – 11111 | 111110 | 0000 – 1111 |

| \|x\| | \|x\| in binary | msb plus one | Refinement bins |
|---|---|---|---|
| 0 | 0 | 0 | - |
| 1 | 1 | 10 | - |
| 2 | 10 | 110 | 0 |
| 3 | 11 | 110 | 1 |
| 4 | 100 | 1110 | 00 |
| 5 | 101 | 1110 | 01 |
| 6 | 110 | 1110 | 10 |
| 7 | 111 | 1110 | 11 |
| 8 – 15 | 1000 – 1111 | 11110 | 000 – 111 |
| 16 – 31 | 10000 – 11111 | 111110 | 0000 – 1111 |

| Bit string form | Range of codeNum |
|---|---|
| 1 | 0 |
| 0 1 $x_0$ | 1..2 |
| 0 0 1 $x_1$ $x_0$ | 3..6 |
| 0 0 0 1 $x_2$ $x_1$ $x_0$ | 7..14 |
| 0 0 0 0 1 $x_3$ $x_2$ $x_1$ $x_0$ | 15..30 |
| 0 0 0 0 0 1 $x_4$ $x_3$ $x_2$ $x_1$ $x_0$ | 31..62 |
| ... | ... |

| Bin index | 0 | 1 | 2 | 3 | 4 | 5 | 6 | >6 |
|---|---|---|---|---|---|---|---|---|
| Horizontal component | 5 | 1 | 1 | 2 | 3 | 4 | 4 | Bypass |
| Vertical component | 0 | 1 | 1 | 2 | 3 | 4 | 4 | Bypass |

| | Descriptor |
|---|---|
| bvd_coding(x0, y0) { | |
|   abs_bvd_msb_idx_p1 [0] | ae(v) |
|   abs_bvd_msb_idx_p1 [1] | ae(v) |
|   if(abs_bvd_msb_idx_p1 [0] > 0) { | |
|     if(abs_bvd_msb_idx_p1 [0] > 1) | |
|     abs_mvd_refinement_bits [0] | ae(v) |
|     bvd_sign_flag [0] | ae(v) |
|   } | |
|   if(abs_bvd_msb_idx_p1 [1] > 0) { | |
|     if(abs_bvd_msb_idx_p1 [1] > 1) | |
|     abs_bvd_refinement_bits [1] | ae(v) |
|     bvd_sign_flag [1] | ae(v) |
|   } | |
| } | |

| mvd_coding(x0, y0) { | Descriptor |
|---|---|
|   abs_mvd_msb_idx_p1 [0] | ae(v) |
|   abs_mvd_msb_idx_p1 [1] | ae(v) |
|   if(abs_mvd_msb_idx_p1 [0] > 0) { | |
|     if(abs_mvd_msb_idx_p1 [0] > 1) | |
|       abs_mvd_refinement_bits [0] | ae(v) |
|     mvd_sign_flag [0] | ae(v) |
|   } | |
|   if(abs_mvd_msb_idx_p1 [1] > 0) { | |
|     if(abs_mvd_msb_idx_p1 [1] > 1) | |
|       abs_mvd_refinement_bits [1] | ae(v) |
|     mvd_sign_flag [1] | ae(v) |
|   } | |
| } | |

| mvd_coding(x0, y0) { | Descriptior |
|---|---|
|   abs_mvd_pref [0] | ae(v) |
|   abs_mvd_pref [1] | ae(v) |
|   if(absMvdSuffixPresentFlag [0] == 1) | |
|     abs_mvd_suffix [0] | ae(v) |
|   if(abs_mvd [0] > 0) | |
|     mvd_sign_flag [0] | ae(v) |
|   if(absMvdSuffixPresentFlag [1] == 1) | |
|     abs_mvd_suffix [1] | ae(v) |
|   if(abs_mvd [1] > 0) | |
|     mvd_sign_flag [1] | ae(v) |
| } | |

METHOD AND APPARATUS FOR EFFICIENT INFORMATION CODING

CROSS REFERENCE TO RELATED PATENT APPLICATIONS

This is a non-provisional patent application claiming the priority benefit of provisional patent application Ser. No. 61/954,151, filed on 17 Mar. 2014, Ser. No. 61/970,384, filed on 26 Mar. 2014, and Ser. No. 62/000,185, filed on 19 May 2014, which are incorporated by reference in their entirety.

TECHNICAL FIELD

Implementations of the present disclosure are generally related to information coding and, more specifically, to information coding in video/image coding.

BACKGROUND

Unless otherwise indicated herein, approaches described in this section are not prior art to the claims listed below and are not admitted to be prior art by inclusion in this section.

Figure 9:
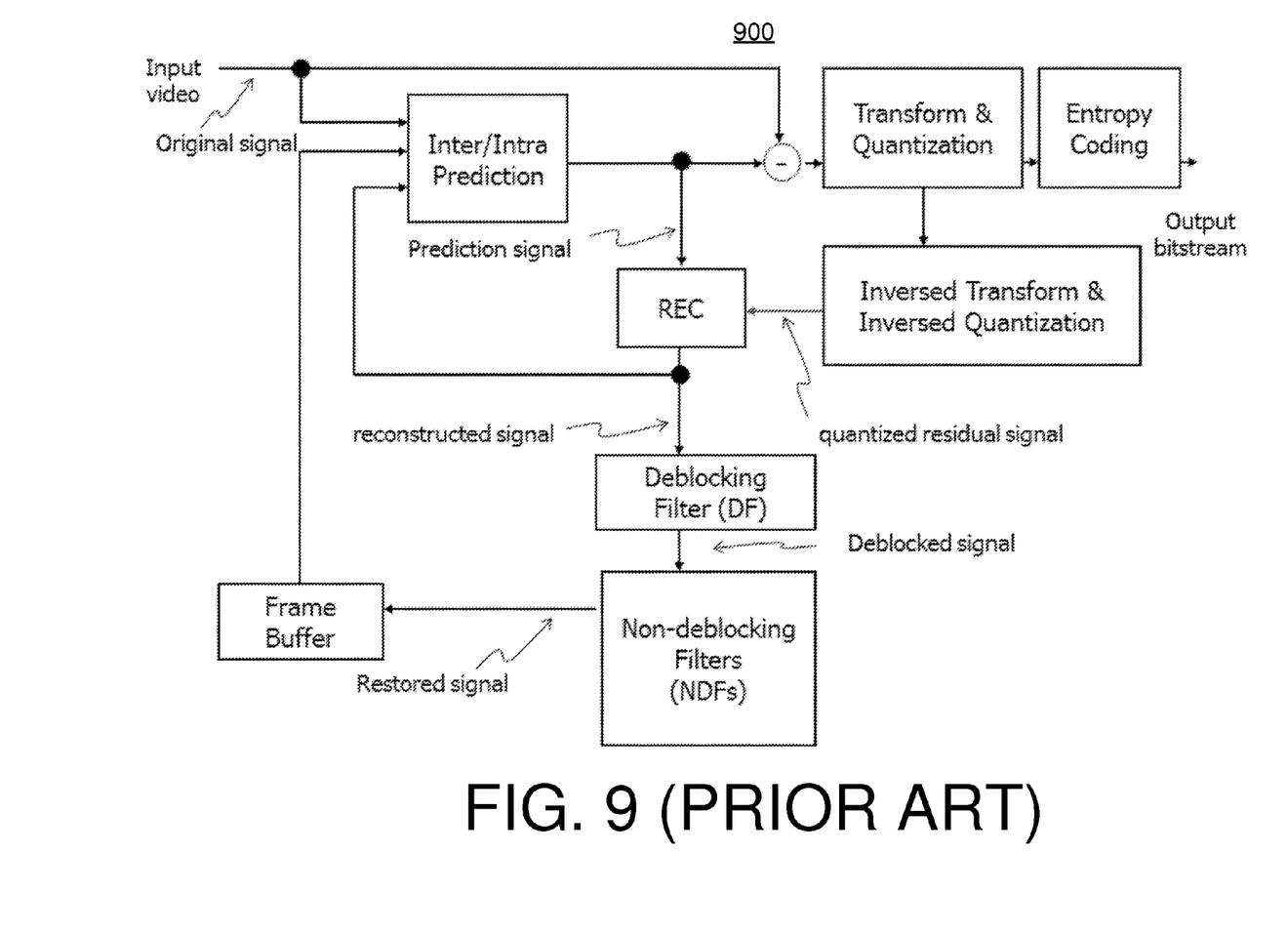
FIG. 9 is a block diagram illustrating a typical HEVC encoding system.

High-efficiency video coding (HEVC) is a new-generation video coding standard developed by the Joint Collaborative Team on Video Coding (JCT-VC). FIG. 9 provides the block diagram of the HEVC encoding system. When the current coding unit is predicted in the Inter mode, the pixels in a prediction unit are predicted by the reconstructed pixels in the coded reference frame after motion compensation, followed by residual coding. The motion information is represented by signaling the motion vector difference (MVD) between a motion vector and a predicted motion vector in the bitstream.

The JCT standardization body is currently in the process of developing the screen content coding (SCC) extension. A new intra block copy (IntraBC) tool, indicated by a new syntax flag intra_bc_flag, has been adopted into the HEVC SCC extension, as specified by HEVC Screen Content Coding: Draft 2 (JCTVC-S1005). When intra_bc_flag is equal to 1, the current coding unit (CU) is coded in the IntraBC mode and is predicted by the reconstructed block region of the same size before deblock and sample adaptive offset (SAO) filtering from the current frame, followed by residual coding. The location of the reference block is indicated by a block vector, specifying the coordinate offsets in the horizontal and vertical directions, respectively, from the current block. The block vector information is represented by signaling the block vector difference (BVD) between a block vector and a predicted block vector in the bitstream.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to improve the efficiency in information coding, including coding for BVD and MVD in the context of HEVC and other video coders.

In one exemplary implementation, a method for entropy coding may code a bin string for signaling a prefix part of a binarized absolute value of a first vector component of a block vector difference (BVD) or a motion vector difference (MVD). The method may code a bin string for signaling a prefix part of a binarized absolute value of a second vector component of the BVD or the MVD. The method may also code a bin string for signaling a suffix part of a binarized absolute value and a sign of the first vector component. The method may further code a bin string for signaling a suffix part of a binarized absolute value and a sign of the second vector component.

In another exemplary implementation, a video coding device may include a context-based adaptive binary arithmetic coding circuit configured to perform entropy coding for either or both of a block vector difference (BVD) and a motion vector difference (MVD). The CABAC circuit may include a binarizer, a context modeler and a binary arithmetic coder. The binarizer may be configured to convert an absolute value of each vector component of the BVD or the MVD into a bin string. The context modeler may be coupled to receive one or more bins of the bin string from the binarizer. The context modeler may be configured to select a probability model from a plurality of probability models for coding the one or more bins in a CABAC mode. The binary arithmetic coder may be coupled to the context modeler and configured to code the one or more bins using the selected probability model. The binary arithmetic coder may be configured to code the one or more bins by performing operations including: coding a bin string for signaling a prefix part of a binarized absolute value of a first vector component; coding a bin string for signaling a prefix part of a binarized absolute value of a second vector component; coding a bin string for signaling a suffix part of a binarized absolute value and a sign of the first vector component; and coding a bin string for signaling a suffix part of a binarized absolute value and a sign of the second vector component.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

The present disclosure proposes schemes, techniques, methods, devices, apparatuses and systems with improved efficiency in information coding, such as coding for block vector difference (BVD) and motion vector difference (MVD) in the context of HEVC. Advantageously, implementations according to the present disclosure enable information coding in a more efficient fashion. Some example areas in which any of the schemes, techniques, methods, devices, apparatuses or systems in accordance with the present disclosure may be applied include screen content coding (SCC), and next-generation video coding.

According to the present disclosure, vertical and horizontal components of MVD or BVD associated with the IntraBC coding mode may be coded with a new scheme proposed herein. Specifically, under the proposed scheme the absolute value of each MVD or BVD component in a binary form may be represented by first signaling its most significant bit (MSB) index followed by and its refinement bits. The MSB index for value 0 is assigned to −1. In the resulting bin string, the absolute value, |d|, of each component of the BVD may be represented by its MSB index followed by its refinement bits. As for binarization a binarized component value is thus a concatenation of a prefix bin string and a suffix bin string. Moreover, under the proposed scheme the prefix bin string may represent the MSB index plus one, hereinafter referred to as "msb_plus_one", of an absolute component value in a unary code. The prefix value msb_plus_one for symbol x may be given with Expression (1) as follows:

$$\text{msb\_plus\_one} = \text{Floor}(\log 2(x))+1, \text{ if } (x>0); 0, \text{ otherwise.} \quad (1)$$

The suffix bin string may represent the refinement bits and is present if msb_plus_one>1. The value of refinement bits, denoted by refinement_bits, may be coded in a fixed-length binary code with a string length equal to msb_plus_one−1. Additionally, under the proposed scheme the prefix part may represent msb_plus_one in a unary code, and the suffix part may represent the refinement bins in a fixed-length binary code. The decoded symbol value x may be provided with Expression (2) as follows:

$$X=(1<<(\text{msb\_plus\_one}-1))+\text{refinement\_bits}, \text{ if msb\_plus\_one}>1; \text{ msb\_plus\_one, otherwise.} \quad (2)$$

The prefix bin string may be coded by the binary arithmetic coder in the CABAC mode with more sophisticated context modeling design. MSB index for syntax value 0 may be assigned to −1, while msb_plus_one may be binarized by the unary code. The remaining refinement bits may be represented in the fixed-length binary code with the codeword length determined by the MSB index. The suffix bin string may be coded by the binary arithmetic coder in the CABAC mode with relatively simple context modeling or in the bypass mode.

Implementations of the present disclosure may be further generalized by using other structured binarization process such as a Rice binarization process or a k-th order Exp-Golomb (EGk) binarization process, as defined in the HEVC standard, or a certain structured binarization process.

At an encoder, it is often necessary to estimate the bit cost for representing a symbol (e.g. a BVD component or MVD component) in the process of determining the coding parameter values. The bit cost may be equal to 1 bit for coding a bin in the bypass mode. The estimated bit cost for coding a bin in the CABAC mode may be derived from the state of the selected context. Therefore, taking BVD as an example, the estimated bit cost for representing a given BVD component may be calculated by accumulating the estimated bit costs of the individual coded CABAC bins plus the number of the coded bypass bins. In this way, all component values coded with the same CABAC bin string and the same number of the bypass bins will have the same estimated bit cost. To speed up the estimation of the BVD bit costs, the estimated BVD bit costs may be pre-calculated or otherwise pre-determined for all CABAC bin string values based on the CABAC states at the beginning of each coding unit. A look-up table (LUT), indexed by the CABAC bin string, may then be built to store the resulting estimated BVD bit costs. The estimated bit cost for the BVD component may be easily found by mapping a given CABAC bin string to the estimated bit cost using the LUT. For example, in some implementations, the bin string for msb_plus_one may be coded in the CABAC mode and all the refinement bins and sign flags may be coded in the bypass mode. In this case, a LUT indexed by the msb_plus_one value may be built for each BVD component.

Example Implementations

Figure 1:
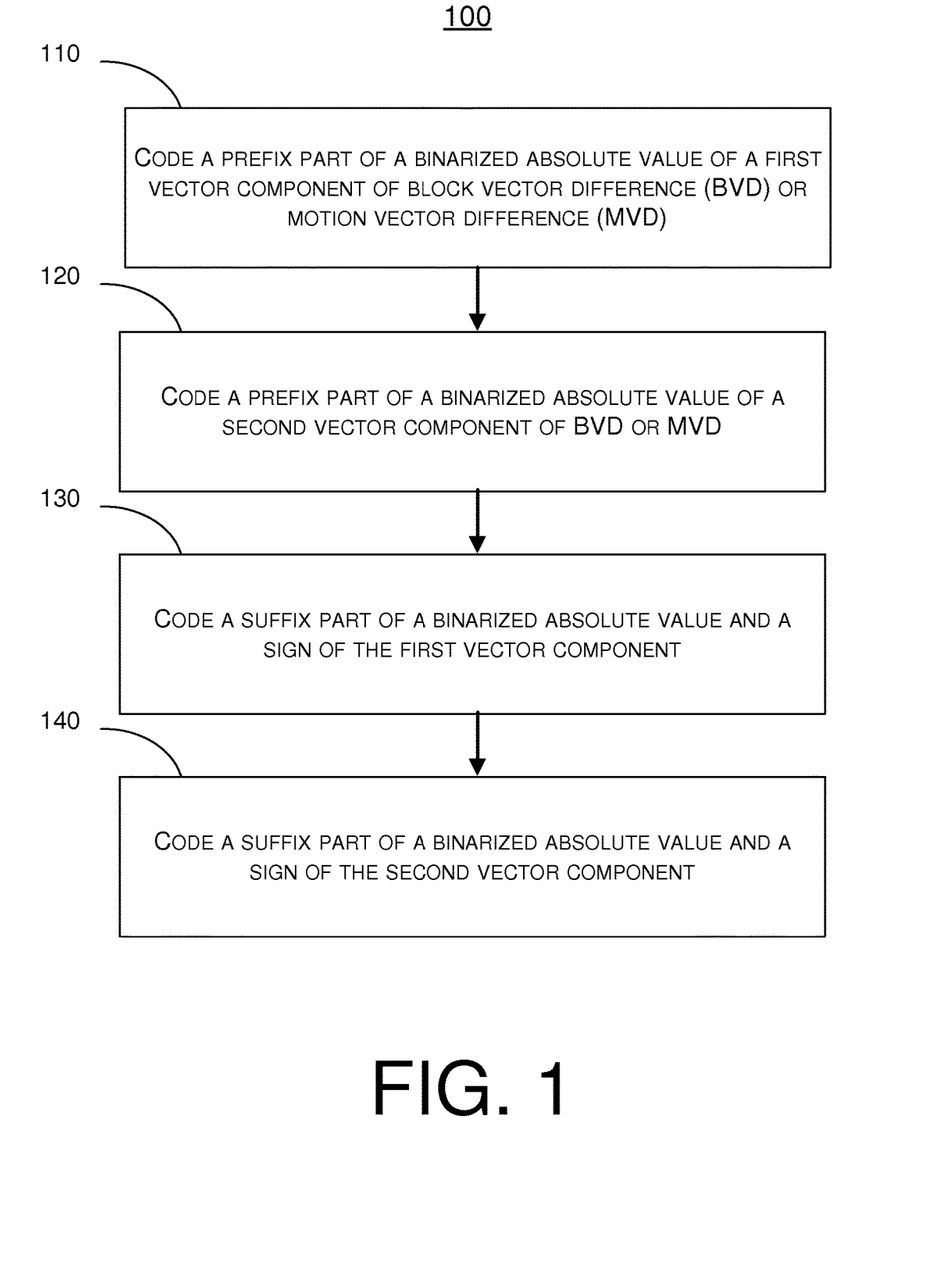
FIG. 1 is a flowchart of an exemplary process for entropy coding in accordance with an implementation of the present disclosure.
Figure 2:
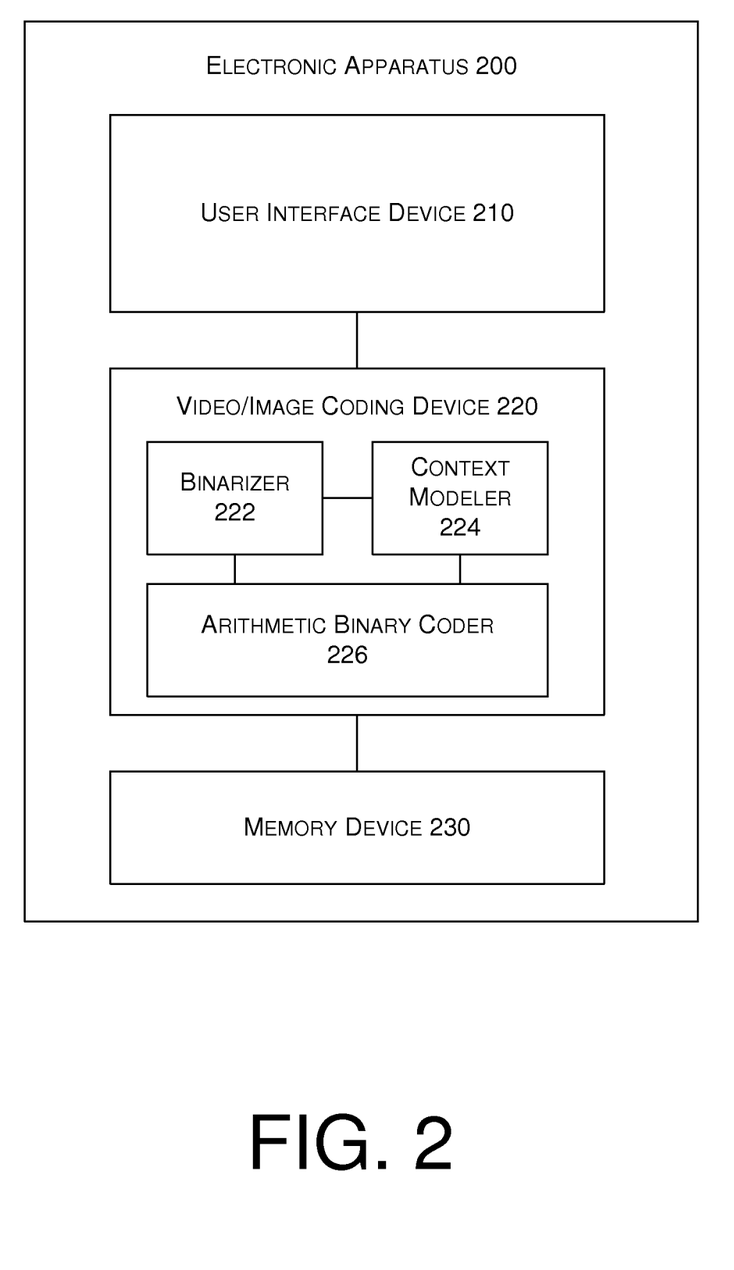
FIG. 2 is a block diagram of an exemplary electronic apparatus in accordance with an implementation of the present disclosure.
Figure 3:
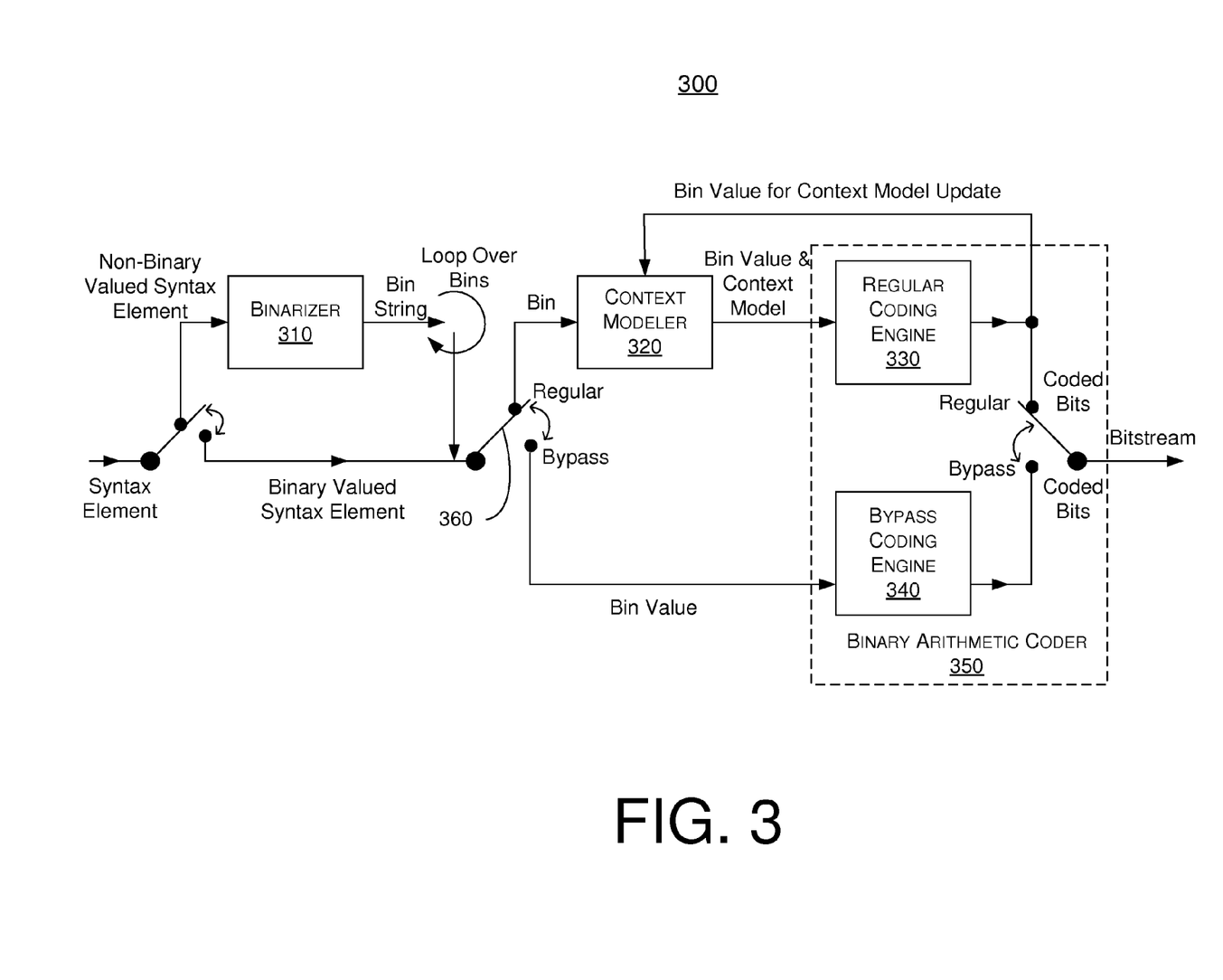
FIG. 3 is a block diagram illustrating a context-based adaptive binary arithmetic coding (CABAC) circuit in which various examples of the present disclosure may be implemented.

FIG. 1 illustrates an exemplary process 100 for entropy coding in accordance with an implementation of the present disclosure. Exemplary process 100 may include one or more operations, actions, or functions as illustrated by one or more of blocks 110, 120, 130 and 140. Although illustrated as discrete blocks, various blocks may be divided into additional blocks, combined into fewer blocks, or eliminated, depending on the desired implementation. Exemplary process 100 may be implemented by an exemplary electronic apparatus 200 (to be described below), a CABAC circuit 300 (to be described below), or a processor of a special-purpose computing device, e.g., a video/image coder. For illustrative purposes, the operations described below are performed by a video/image coding device 220 of exemplary electronic apparatus 200.

At 110, exemplary process 100 may involve video/image coding device 220 coding a bin string for signaling a prefix part of a binarized absolute value of a first vector component of BVD or MVD.

At 120, exemplary process 100 may involve video/image coding device 220 coding a bin string for signaling a prefix part of a binarized absolute value of a second vector component of BVD or MVD.

At 130, exemplary process 100 may involve video/image coding device 220 coding a bin string for signaling a suffix part of a binarized absolute value and a sign of the first vector component.

At 140, exemplary process 100 may involve video/image coding device 220 coding a bin string for signaling a suffix part of a binarized absolute value and a sign of the second vector component.

In some implementations, for either or both of the first vector component and the second vector component, the prefix part may signal an MSB index plus one of the binarized absolute value of the respective vector component in a unary code.

In some implementations, for either or both of the first vector component and the second vector component, the suffix part may signal refinement bits of the binary absolute value of the respective vector component in a fixed-length code.

In some implementations, exemplary process 100 may further involve video/image coding device 220 generating, for either or both of the first vector component and the second vector component, at least one of the prefix part and the suffix part by using a Rice binarization process, a k-th order Exp-Golomb (EGk) binarization process, or a certain structured binarization process.

In some implementations, for either or both of the first vector component and the second vector component, the length of a suffix part may be variable, and may be derived from the prefix part or determined according to the prefix part.

In some implementations, exemplary process 100 may further involve video/image coding device 220 coding in a bypass mode for a bin having a bin index in a bin string greater than a predefined threshold.

In some implementations, exemplary process 100 may involve video/image coding device 220 using a same formation of a prefix code and a suffix code for coding the MVD and the BVD.

In some implementations, exemplary process 100 may further involve video/image coding device 220 assigning different contexts for coding bins of a plurality of bin indices from a bin string with context assignment dependent on as bin index in the bin string.

In some implementations, one or more bins with adjacent bin indices may share one or more contexts of the different contexts.

In some implementations, at least two bins with bin indices greater than a predefined threshold may share one or more contexts of the different contexts.

In some implementations, a first vector component and a second vector component of the BVD or the MVD may share one or more contexts for at least some bin indices and use separate contexts for at least some bin indices.

In some implementations, one or more contexts of the different contexts may be shared for coding binarized absolute values of vector components of BVD and MVD.

FIG. 2 illustrates an exemplary electronic apparatus 200 in accordance with an implementation of the present disclosure. Exemplary electronic apparatus 200 may perform various functions related to schemes, techniques, methods and approaches described herein, including exemplary process 100 described above and any variations thereof. Exemplary electronic apparatus 200 may be implemented as a mobile device, e.g., a smartphone, or a computing device, e.g., a laptop computer, a notebook computer, a tablet computer, a phablet, a personal digital assistant (PDA), a desktop computer or the like. Exemplary electronic apparatus 200 may include at least those components shown in FIG. 2, such as a user interface device 210, a video/image coding device 220 and a memory device 230.

User interface device 210 may be configured to display textual information, graphics and video imagery. Optionally, user interface device 210 may also be configured to play audio signals. Optionally, user interface device 210 may be configured to receive user input from a user of exemplary apparatus 200 by any mechanism, e.g., touch-sensing panel, keyboard, microphone. Memory device 230 may be configured to store data, e.g., video data, therein.

Video/image coding device 220, coupled to user interface device 210 and memory device 230, may include a binarizer 222, a context modeler 224 and an arithmetic binary coder 226. Video/image coding device 220 may be configured to perform entropy coding for either or both of BVD and MVD. Binarizer 222 may be configured to convert an absolute value of each vector component of BVD or MVD into a bin string. Context modeler 224 may be coupled to receive one or more bins of the bin string from binarizer 224. Context modeler 224 may be configured to select a probability model from a plurality of probability models for coding the one or more bins in a CABAC mode. Binary arithmetic coder 226 may be coupled to context modeler 224, and may be configured to code the one or more bins using the selected probability model. Moreover, binary arithmetic coder 226 may be configured to code the one or more bins by performing operations that include: coding a bit string for signaling a prefix part of a binarized absolute value of a first vector component; coding a bit string for signaling a prefix part of a binarized absolute value of a second vector component; coding a bit string for signaling a suffix part of a binarized absolute value and a sign of the first vector component; and coding a bit string for signaling a suffix part of a binarized absolute value and a sign of the second vector component.

In some implementations, for either or both of the first vector component and the second vector component, the suffix part may signal refinement bits of the binary absolute value of the respective vector component in a fixed-length code.

In some implementations, binary arithmetic coder 226 may be further configured to code at least one bin of the one or more bins in a bypass mode in response to the at least one bin having a bin index in a bin string greater than a predefined threshold.

In some implementations, for either or both of the first vector component and the second vector component, at least one of the prefix part and the suffix part may be generated by using a Rice binarization process, a k-th order Exp-Golomb (EGk) binarization process, or a certain structured binarization process.

In some implementations, for either or both of the first vector component and the second vector component, the length of a suffix part may be variable.

In some implementations, the length of the suffix part may be derived from the prefix part.

In some implementations, binarizer 222 may be further configured to binarize by using a same formation of a prefix code and a suffix code for coding the MVD and the BVD.

In some implementations, context modeler 224 may be further configured to assign different contexts for coding bins of a plurality of bin indices from a bin string with context assignment dependent on a bin index in the bin string.

In some implementations, one or more bins with adjacent bin indices may share one or more contexts of the different contexts.

In some implementations, at least two bins with bin indices greater than a predefined threshold may share one or more contexts of the different contexts.

In some implementations, a first vector component and a second vector component of the BVD or the MVD may share one or more contexts of the different contexts for at least some bin indices and use separate contexts for at least some bin indices.

In some implementations, one or more contexts of the different contexts may be shared for coding binarized absolute values of vector components of the BVD or the MVD.

FIG. 3 illustrates a context-based adaptive binary arithmetic coding (CABAC) circuit 300 in which various examples of the present disclosure may be implemented. For instance, CABAC circuit 300 may be implemented in video/image coding device 220 of exemplary electronic apparatus 200. For achieving high compression efficiency, CABAC circuit 300 (to be described further below) is employed for entropy coding the values of the syntax elements. CABAC circuit 300 encodes binary symbols. The probability models are selected adaptively based on the contextual information. In operation, CABAC circuit 300 utilizes multiple probability models, corresponding to different contexts. All non-binary symbols are first converted into binary by CABAC circuit 300. CABAC circuit 300 selects which probability model to use, for each bin. CABAC circuit 300 then applies arithmetic coding to compress the data.

Referring to FIG. 3, CABAC circuit 300 may include a binarizer 310, a context modeler 320, a regular coding engine 330 and a bypass coding engine 340. Regular coding engine 330 and bypass coding engine 340 together form a binary arithmetic coder 350. CABAC circuit 300 may be implemented in video/image coding device 220. For example, binarizer 110 of CABAC circuit 300 may be implemented as binarizer 222, context modeler 320 of CABAC circuit 300 may be implemented as context modeler 224, and arithmetic binary coder 350 of CABAC circuit 300 may be implemented as binary arithmetic coder 226. The function/operation of each component of CABAC circuit 300 is described below.

As CABAC circuit 300 performs binary arithmetic coding, it encodes binary decisions. Accordingly, binarizer 310 "binarizes" a non-binary-valued symbol such as a transform coefficient or a motion vector difference component, for example, by converting the symbol value into a bin string prior to arithmetic coding by binary arithmetic coder 350. This process may be similar to the process of converting a data symbol into a variable-length code although the binary code is further encoded, by binary arithmetic coder 350, prior to transmission. A given bin string may be coded in either the CABAC mode or the bypass mode according to a control of switch 360. Specifically, a bin string is coded in the CABAC mode when it is processed by context modeler 320 and regular coding engine 330, and a bin string is coded in the bypass mode when it is processed by bypass coding engine 340.

The terms "context model" and "modeling context" may be used interchangeably herein to refer to a probability model for one or more bins of the binarized symbol. Context modeler 320 may choose or otherwise select a context model from a selection of available context models depending on the statistics of recently coded data symbols. Context modeler 320 may store, in context modeler 320 or a cache or memory coupled to context modeler 320, the probability of each bin, which may be "1" or "0". The selected context model may be updated based on the actual coded value. Regular coding engine 330 in binary arithmetic coder 350 encodes each bin according to the selected context model, or probability model.

Thus, as binary arithmetic coder 350 of CABAC circuit 300 encodes binary symbol values, CABAC circuit 300 first converts the values of syntax elements into a binary string by binarizer 310. During the coding process, probability models are gradually built up by context modeler 320 from the coded symbols for different modeling contexts. The selection of the modeling context for coding the next binary symbol by regular coding engine 330 may be determined by coded information. On the other hand, symbols may be encoded without the context modeling stage and assume an equal probability distribution, commonly referred to as the bypass mode, for reduced complexity. Such symbols are processed by bypass coding engine 340.

Figure 4:
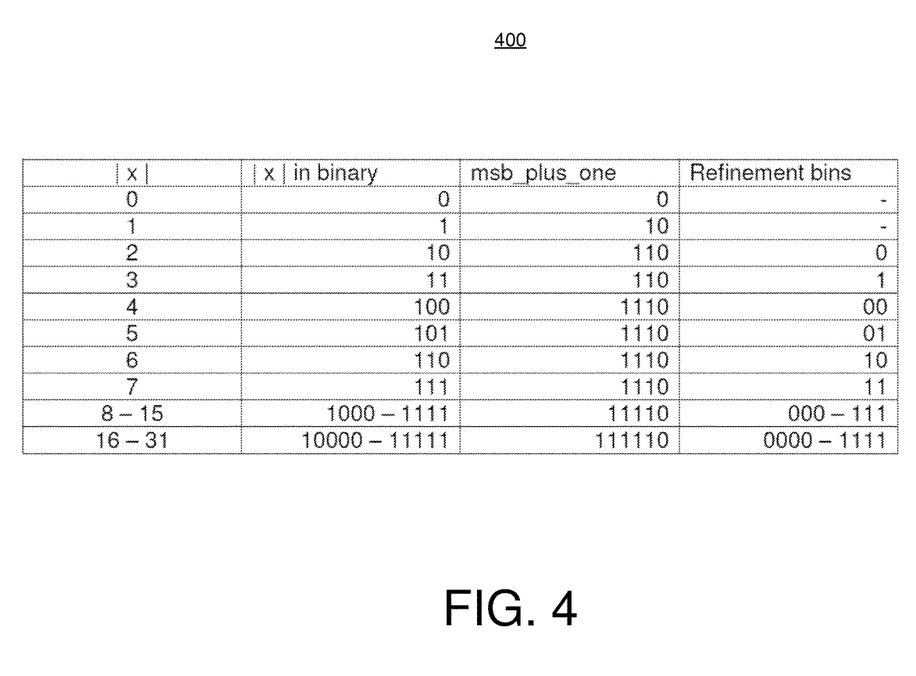
FIG. 4 is a table showing bin strings after binarization according to a proposed scheme of the present disclosure.
Figure 5:
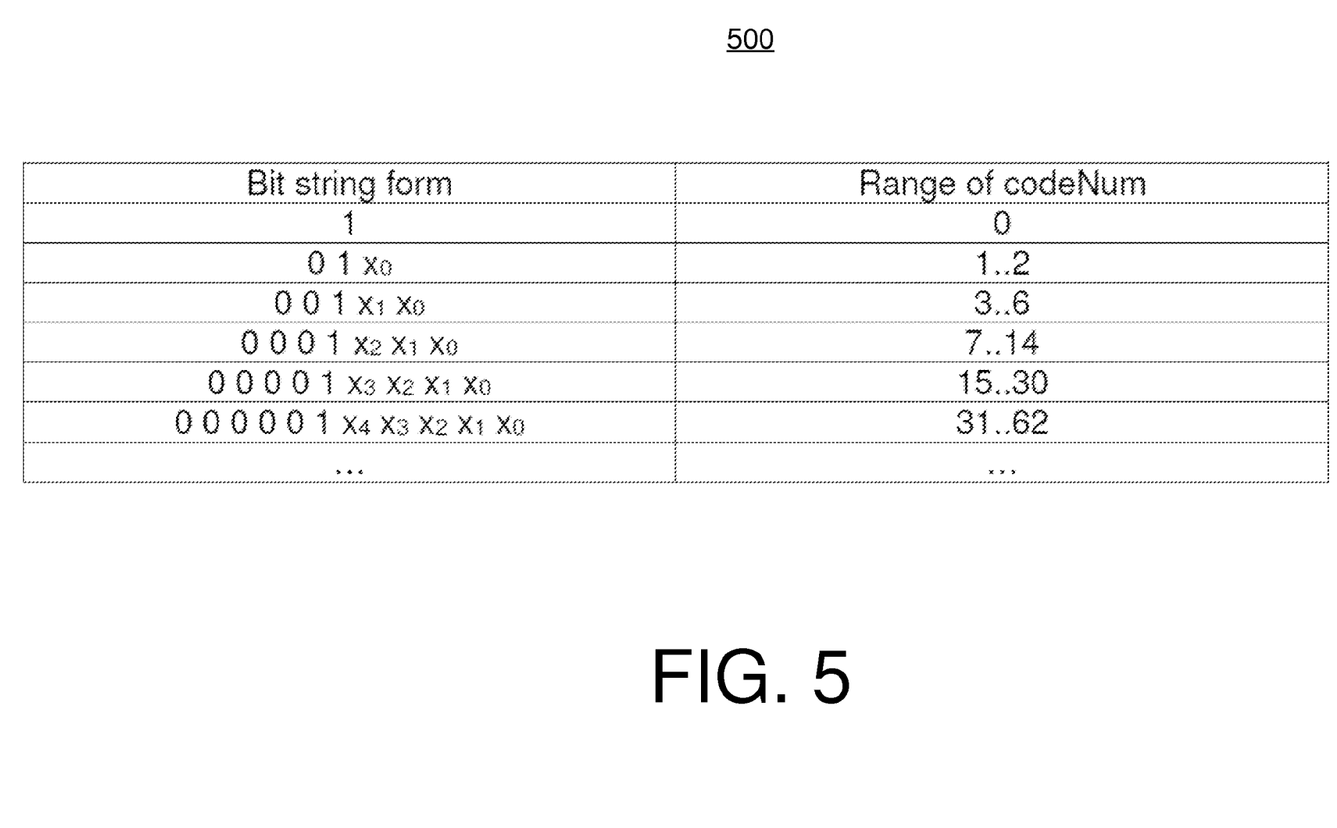
FIG. 5 is a table showing binarization of Exp-Golomb code when K=0.
Figure 6:
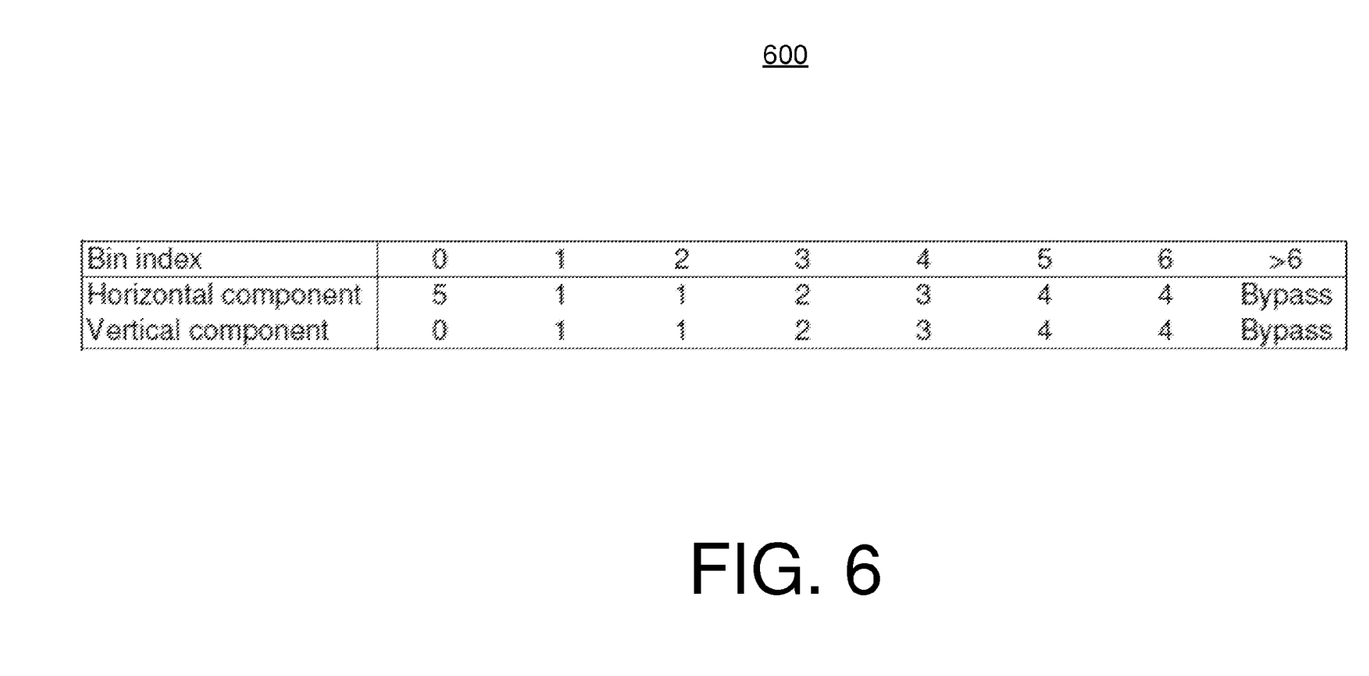
FIG. 6 is a table showing example context selections in accordance with an implementation of the present disclosure.
Figure 7:
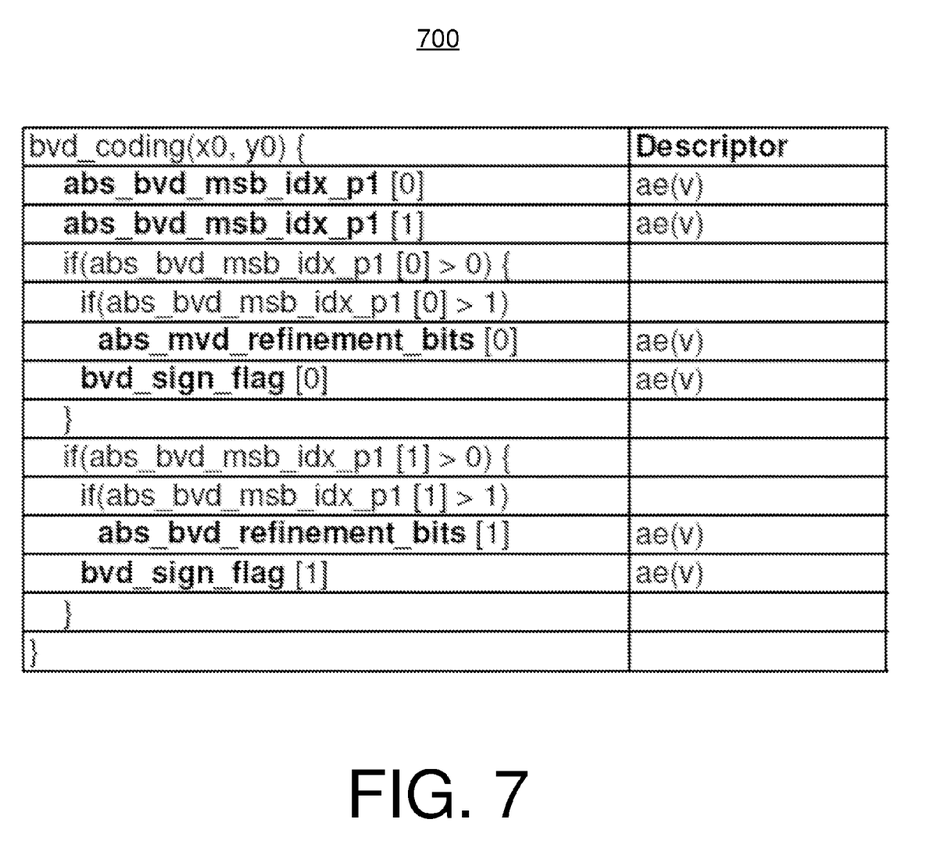
FIG. 7 is an example syntax table for block vector difference in accordance with an implementation of the present disclosure.
Figure 8:
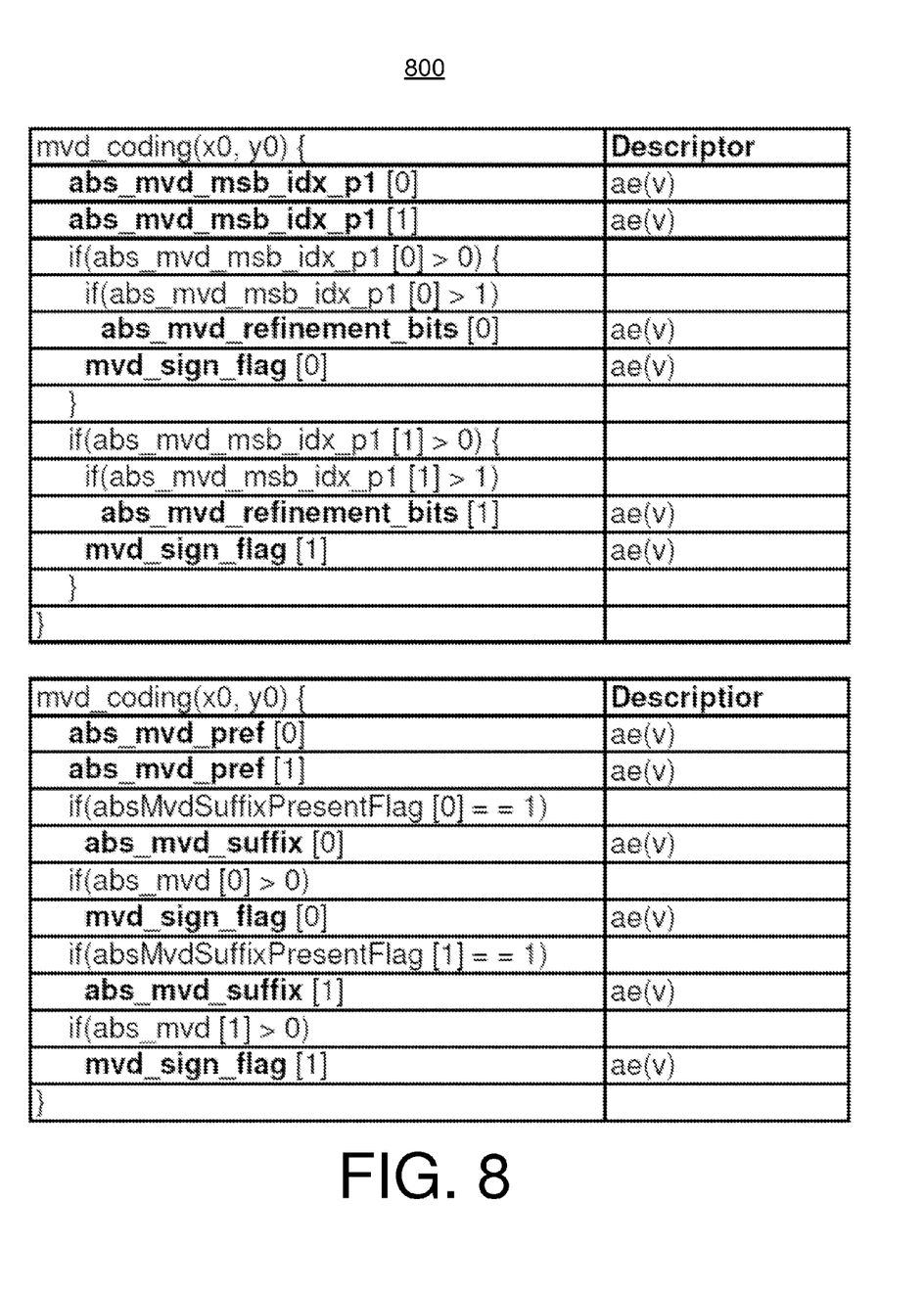
FIG. 8 is an example syntax table for motion vector difference in accordance with an implementation of the present disclosure.

A number of examples pertaining to implementation of schemes, techniques, methods, devices, apparatuses or systems of the present disclosure are shown in FIG. 4-FIG. 8. FIG. 4 shows a table 400 of bin strings after binarization according to a proposed scheme of the present disclosure. FIG. 5 shows a table 500 of binarization of EG code when K=0. FIG. 6 shows a table 600 of example context selections in accordance with an implementation of the present disclosure. FIG. 7 shows an example syntax table 700 for BVD in accordance with an implementation of the present disclosure. FIG. 8 shows an example syntax table 800 for MVD in accordance with an implementation of the present disclosure.

In CABAC circuit 300, bin strings generated or otherwise provided by binarizer 310 are coded in either CABAC mode or bypass mode. A number of example implementations, e.g., using CABAC circuit 300, are provided below.

In some implementations, a plurality of the bins or bin string for representing msb_plus_one may be coded in the CABAC mode. For example, the bin representation for msb_plus_one may be coded from bin0, with the first few bins coded in the CABAC mode and the remaining bins coded in the bypass mode. Alternatively, all the bins for msb_plus_one may be coded in the CABAC mode.

In some implementations, all the refinement bins may be coded in the bypass mode. In some implementations, the first refinement bin from the MSB may be coded in the CABAC mode for all |d| or for each |d| that is greater than a predefined threshold value T1.

In the CABAC mode, context modeler 320 performs context selection. In some implementations, context modeler 320 may assign different contexts for coding different bin indices. In some implementations, some of the bins with adjacent bin indices may share the same set of contexts. Alternatively, all the bins with indices greater than a predefined threshold T may be assigned to the same set of contexts. In some implementations, separate context sets may be employed for the CABAC bins (those bins coded in the CABAC mode) resulting from the horizontal component and the vertical components. In some implementations, some contexts may be shared by vertical and horizontal components of BVD and some contexts may be dedicated to a given component. In other implementations, some contexts may be shared for coding the absolute values of BVD and MVD components. One such example of context selection for coding msb_plus_one is provided in table 600 in FIG. 6. In one example, referring to FIG. 6, the first two contexts may be shared for both BVD and MVD in that the two contexts may be concurrently used for HEVC MVD coding.

In some implementations, the sign flag may be coded in the bypass mode. Alternatively, the sign flag may be coded in the CABAC mode conditioned on the previous coded sign symbols.

In some implementations, all the bypass bins (those bins coded in the bypass mode) from both horizontal and vertical components may be grouped together and coded in a row to improve the parsing throughput rate. Syntax tables 700 and 800 in FIG. 7 and FIG. 8, respectively, are examples in which all msb_plus_one bins are coded in the CABAC mode while all refinement bins and sign flags are coded in the bypass mode.

Highlight of Select Features

The present disclosure provides schemes, techniques, methods, devices, apparatuses and systems for coding BVD and MVD, and BVD and MVD may be coded in a unified way. The present disclosure also provides implementations for context modeling for coding BVD and MVD. For example, there may be separate contexts. There may be shared contexts for adjacent bins. There may be shared contexts for two vector components, e.g., horizontal component and vertical component. There may be contexts for coding BVD and MVD. The present disclosure also proposes syntax to group sign bins and refinement bins from the two vector components.

According to the present disclosure, a scheme, technique or method for entropy coding the BVD and/or MVD in a video coding device, apparatus or system may perform a number of operations. Firstly, a prefix part of a binarized absolute value of a first vector component may be coded. Secondly, a prefix part of a binarized absolute value of a second vector component may be coded. Thirdly, a suffix part of a binarized absolute value and a sign of the first vector component may be coded. Then, a suffix part of a binarized absolute value and a sign of the second vector component may be coded. The first vector component may be a vertical component, and the second vector component may be a horizontal component. Alternatively, the first vector component may be a horizontal component, and the second vector component may be a vertical component.

For either or both of the first vector component and the second vector component, the prefix part may signal an MSB index plus one of the binarized absolute value of the respective vector component in a unary code. Moreover, for either or both the first vector component and the second vector component, the suffix part may signal refinement bits of the binary absolute value of the respective vector component in a fixed-length code.

For either or both of the first vector component and the second vector component, either or both of the prefix part and the suffix part may be generated using a Rice binarization process or a k-th order Exp-Golomb (EGk) binarization process. The length of a suffix part may be variable and, for example, may be derived from the prefix part.

According to the present disclosure, a CABAC method for entropy coding a prediction difference vector in the IntraBC coding mode may perform a number of operations. Firstly, binarization may be performed, e.g., by binarizer 310, to convert an absolute value of each vector component into a bin string. This may be accomplished by first representing an MSB index plus one, e.g., msb_plus_one, with a unary code, followed by representing respective refinement bits by a fixed-length binary code together with a sign bit. Subsequently, context-based adaptive binary arithmetic coding may be performed, e.g., by context modeler 320 and regular coding engine 330, on the bin string. The operations described herein may be applied to coding of BVD as well as MVD.

According to the present disclosure, vertical and horizontal components of MVD or BVD may be coded with a new scheme proposed herein. Specifically, under the proposed scheme the absolute value of each MVD or BVD component in a binary form may be represented by first signaling its most significant bit (MSB) index followed by its refinement bits. The MSB index for value 0 is assigned to −1. The resulting bin string, as performed by binarizer 310, for a binarized component value is thus a concatenation of a prefix bin string and a suffix bin string. The prefix bin string represents the MSB index plus one, hereinafter referred to as "msb_plus_one", of an absolute component value in a unary code. The prefix value msb_plus_one for symbol x can be given with Expression (1) as follows:

$$\text{msb\_plus\_one} = \text{Floor}(\log 2(x))+1, \text{ if } (x>0); 0, \text{ otherwise}. \tag{1}$$

The suffix bin string represents the refinement bits and is present if msb_plus_one>1. The value of refinement bits, denoted by refinement_bits, is coded in a fixed-length binary code with the string length equal to msb_plus_one−1. The decoded symbol value x may be provided with Expression (2) as follows:

$$X=(1<<(\text{msb\_plus\_one}-1))+\text{refinement\_bits}, \text{ if msb\_plus\_one}>1; \text{ msb\_plus\_one, otherwise}. \tag{2}$$

The prefix bin string can be coded by the binary arithmetic coder in the CABAC mode with more sophisticated context modeling design. The suffix bin string can be coded by the binary arithmetic coder in the CABAC mode with relatively simple context modeling or in the bypass mode.

Inventive concepts of the present disclosure may be further generalized by using other structured binarization process such as a Rice binarization process or a k-th order Exp-Golomb (EGk) binarization process, as defined in the HEVC standard.

In some implementations, a plurality of bins for representing msb_plus_one may be coded in the CABAC mode.

In some implementations, the first N bins from index 0 for representing msb_plus_one may be coded in the CABAC mode and the remaining bins may be coded in the bypass mode. In some implementations, the maximum number of the CABAC bins may be limited by a specified number coded in the bitstream.

In some implementations, all the bins for representing msb_plus_one may be coded in the CABAC mode. Alternatively, the bin string for the MSB index plus one may be coded in the CABAC mode and different contexts may be assigned to different bin indices.

In some implementations, some of the adjacent bin indices may share the same set of the contexts.

In some implementations, a context index, ctxIdx, for coding the bin index j of the bin string representing msb_plus_one may be provided by Expression (3) as follows:

$$\text{ctxIdx}[j]=j \text{ for } j<T, \text{ and ctxIdx}[j]=T \text{ otherwise}. \tag{3}$$

In some implementations, one or more fixed-length refinement bits may be coded in the bypass mode.

In some implementations, the most significant bins of the refinement bits may be coded in the CABAC mode for all |d| or for |d| greater than a predefined threshold value T, with the remaining bins coded in the bypass mode. In some implementations, two or more MSBs of the refinement bits corresponding to different msb_plus_one values may be assigned to different contexts.

In some implementations, separate context sets may be employed for the CABAC bins resulting from the horizontal component and the vertical component.

In some implementations, all the bypass bins from both horizontal and vertical components may be grouped together as a group bins and coded in a row, the group bins may be selected from at least two of the following sub-groups, including bypass bins for coding msb_plus_one values, refinement bits and sign bits.

In some implementations, the syntax table may be specified by a syntax table similar or identical to syntax table 600 and/or syntax table 700.

In some implementations, the msb_plus_one may be binarized by a truncated unary code with a specified maximal truncation value.

In some implementations, a component of the prediction difference vector may be in the range of $-2^N+1$ to $2^N-1$, N being an integer. A value of N may be different for two BVD components. In some implementations, the value of N may be equal to 7 or 15. In some implementations, N may be coded in the bitstream. Alternatively, N may be coded in the SPS, PPS or slice segment header of the HEVC standard.

In some implementations, N may be derived from the profile or level constraints of the HEVC standard.

In some implementations, two different thresholds Th and Tv may be employed for the two vector difference components. In some implementations, a value of Th may be equal to 7 for the horizontal component and a value of Tv may be equal to 6 for the vertical component.

In some implementations, a value of N may be equal to 7 for the horizontal component and equal to 6 for the vertical component.

In some implementations, the bit cost for coding BVD may be fast estimated utilizing a look-up table. In some implementations, the look-up table may be indexed by msb_plus_one.

In some implementations, separate look-up tables may be employed for the two BVD components. In some implementations, the two BVD components may share the same set of the contexts when the bin index is greater than a predefined threshold S and, otherwise, may employ separate context sets. In some implementations, a value of the predefined threshold S may be equal to 0, 1 or 2.

In some implementations, some of the contexts may be shared for entropy coding BVD and MVD bins.

In some implementations, the two contexts employed for entropy coding the bin indices 0 and 1 of the binarized MVD components may be shared for coding bin indices 0 and 1 of msb_plus_one for both BVD components, or for an individual component.

In some implementations, a syntax flag may be coded in the SPS, PPS or slice header to indicate the use of a method according to the present disclosure for coding BVD and/or MVD.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method for entropy coding a block vector difference (BVD) or a motion vector difference (MVD) using context-based adaptive binary arithmetic coding (CABAC) with a plurality of contexts in an image coder or a video coder, the method comprising:
 coding, by a binary arithmetic coder, a bin string for signaling a prefix part of a codeword generated by a binarization process of an absolute value of a first vector component of a BVD or an MVD;
 coding, by the binary arithmetic coder, a bin string for signaling a prefix part of a codeword generated by the binarization process of an absolute value of a second vector component of the BVD or the MVD;
 coding, by the binary arithmetic coder, a bin string for signaling a suffix part of the codeword generated by the binarization process of the absolute value and a sign of the first vector component; and
 coding, by the binary arithmetic coder, a bin string for signaling a suffix part of the codeword generated by the binarization process of the absolute value and a sign of the second vector component,
 wherein, for either or both of the first vector component and the second vector component, the prefix part signals a most significant bit (MSB) index plus one of the binarized absolute value of the respective vector component in a unary code, and
 wherein the MSB index plus one for symbol x is based on:

$$\text{msb\_plus\_one} = \text{Floor}(\log 2(x)) + 1, \text{ if } (x>0); 0, \text{ otherwise},$$

wherein the msb-plus-one is a value of the MSB index plus one.

2. The method of claim 1, wherein, for either or both of the first vector component and the second vector component, the prefix part signals a most significant bit (MSB) index plus one of the binarized absolute value of the respective vector component in a unary code.

3. The method of claim 2, wherein, for either or both of the first vector component and the second vector component, the suffix part signals refinement bits of the binary absolute value of the respective vector component in a fixed-length code.

4. The method of claim 1, further comprising:
 for either or both of the first vector component and the second vector component, generating the prefix part and the suffix part by using a Rice binarization process, a k-th order Exp-Golomb (EGk) binarization process, or a certain structured binarization process.

5. The method of claim 1, wherein, for either or both of the first vector component and the second vector component, a length of the suffix part is variable and is derived from the prefix part.

6. The method of claim 1, wherein the coding further comprises coding in a bypass mode for a bin having a bin index in a bin string greater than a predefined threshold.

7. The method of claim 1, further comprising:
 assigning different contexts for coding bins of a plurality of bin indices from a bin string with context assignment dependent on a bin index in the bin string.

8. The method of claim 7, wherein one or more bins with adjacent bin indices share one or more contexts of the different contexts.

9. The method of claim 7, wherein at least two bins with bin indices greater than a predefined threshold share one or more contexts of the different contexts, and wherein at least two bins with bin indices greater than the predefined threshold and smaller than another predefined threshold share one or more contexts of the different contexts.

10. The method of claim 7, wherein a first vector component and a second vector component of the BVD or the MVD share one or more contexts for at least some bin indices and use separate contexts for at least some bin indices.

11. The method of claim 7, wherein one or more contexts of the different contexts are shared for coding the BVD or the MVD.

12. A video coding device, comprising:
 a context-based adaptive binary arithmetic coding (CABAC) circuit configured to perform entropy coding for either or both of a block vector difference (BVD) and a motion vector difference (MVD), the CABAC circuit comprising:
 a binarizer configured to convert an absolute value of each vector component of the BVD or the MVD into a bin string;
 a context modeler coupled to receive one or more bins of the bin string from the binarizer, the context modeler configured to select a probability model from a plurality of probability models for coding the one or more bins in a CABAC mode; and
 a binary arithmetic coder coupled to the context modeler, the binary arithmetic coder configured to code the one or more bins using the selected probability model,
 wherein the binary arithmetic coder is configured to code the one or more bins by performing operations comprising:
 coding a bin string for signaling a prefix part of a codeword generated by a binarization process of an absolute value of a first vector component;
 coding a bin string for signaling a prefix part of a codeword generated by the binarization process of an absolute value of a second vector component;
 coding a bin string for signaling a suffix part of the codeword generated by the binarization process of the absolute value and a sign of the first vector component; and
 coding a bin string for signaling a suffix part of the codeword generated by the binarization process of the absolute value and a sign of the second vector component,
 wherein, for either or both of the first vector component and the second vector component, the prefix part signals a most significant bit (MSB) index plus one of the binarized absolute value of the respective vector component in a unary code, and
 wherein the MSB index plus one for symbol x is based on:

$$\text{msb\_plus\_one} = \text{Floor}(\log 2(x)) + 1, \text{ if } (x>0); 0, \text{ otherwise},$$

wherein the msb-plus-one is a value of the MSB index plus one.

13. The device of claim 12, wherein, for either or both of the first vector component and the second vector component, the prefix part signals a most significant bit (MSB) index plus one of the binarized absolute value of the respective vector component in a unary code.

14. The device of claim 13, wherein, for either or both of the first vector component and the second vector component, the suffix part signals refinement bits of the binary absolute value of the respective vector component in a fixed-length code.

15. The device of claim 12, wherein the binary arithmetic coder is further configured to code at least one bin of the one or more bins in a bypass mode in response to the at least one bin having a bin index in a bin string greater than a predefined threshold.

16. The device of claim 12, wherein, for either or both of the first vector component and the second vector component, at least one of the prefix part and the suffix part is generated by using a Rice binarization process, a k-th order Exp-Golomb (EGk) binarization process, or a certain structured binarization process.

17. The device of claim 12, wherein, for either or both of the first vector component and the second vector component, a length of the suffix part is variable and is derived from the prefix part.

18. The device of claim 12, wherein the context modeler is further configured to assign different contexts for coding bins of a plurality of bin indices from a bin string with context assignment dependent on a bin index in the bin string.

19. The device of claim 18, wherein one or more bins with adjacent bin indices share one or more contexts of the different contexts.

20. The device of claim 18, wherein at least two bins with bin indices greater than a predefined threshold share one or more contexts of the different contexts, and wherein at least two bins with bin indices greater than the predefined threshold and smaller than another predefined threshold share on or more contexts of the different contexts.

21. The device of claim 18, wherein a first vector component and a second vector component of the BVD or the MVD share one or more contexts for at least some bin indices and use separate contexts for at least some bin indices.

22. The device of claim 18, wherein one or more contexts of the different contexts are shared for coding the BVD or the MVD.

23. The method of claim 1, wherein the coding of the bin string for signaling the prefix part of the first vector component includes at least three context-coded bins.

24. The method of claim 1, wherein the binarization process is one of (i) a k-th order Rice binarization process with k>0, (ii) a k-th order Exp-Golomb (ECk) binarization process with k>=0, and (iii) a certain structured binarization process, wherein, for either or both of the first vector component and the second vector component, the suffix part signals refinement bits of the binarized absolute value of the respective vector component in a fixed-length code, and wherein at least three leading bins of each of the bin strings for signaling the prefix part are coded in a CABAC mode.

* * * * *